INVENTORS:
W. B. BANKS
J. A. CONNORS
BY: J. H. McCarthy
THEIR AGENT

INVENTORS:
W. B. BANKS
J. A. CONNORS
BY: J. H. McCarthy
THEIR AGENT

United States Patent Office 2,831,350
Patented Apr. 22, 1958

2,831,350

METERING SEPARATOR

William B. Banks, Odessa, Tex., and Jack A. Connors, The Hague, Netherlands, assignors to Shell Development Company, New York, N. Y., a corporation of Delaware Application March 10, 1955, Serial No. 493,431

3 Claims. (Cl. 73—200)

The present invention relates to apparatus for metering fluids and pertains more particularly to an apparatus for accurately measuring the components of oil well production fluids.

In many oil fields gas is often produced along with the oil from the wells. It is therefore necessary to separate the gas and the oil components of the production fluid before measuring the amount of each component produced. Since small amounts of gas are often entrapped or dissolved in the oil after the major amount of gas has been separated from the oil, errors are possible when an attempt is made to meter the oil by positive-displacement type meters.

It is therefore a primary object of this invention to provide an apparatus for accurately measuring or metering oil field production fluids which are delivered from a well in the form of a mixture of gas and oil.

A further object of this invention is to provide an apparatus for separating the gaseous component of oil field production fluids from the liquid component prior to metering both components.

Another object of this invention is to provide a metering apparatus for separating the gas and oil components of the production fluid, and means for subsequently allowing any entrained or entrapped gases in the separated oil to escape while the oil is being metered.

Due to the turbulent motion of the fluid level in a rapidly filling or emptying vessel equipped with upper and lower level float switches, the level at which a flow switch is actuated may vary as much as by one inch. This inconsistency results in an appreciable volume error across the area of the vessel. It is, therefore, an additional object of this invention to provide means for locating top and bottom float switches in a metering separator so that an error of one inch in the level of the fluid being measured causes a volumetric error which is negligible as compared with the volume of fluid being metered by the separator.

In metering fluid by measuring it in a tank which is repeatedly filled and emptied, an error is often introduced in the volumes of fluid being measured by the lag in closing the valves which control the flow of fluid into or out of the metering tank. Therefore, it is also an object of this invention to provide means for operating the discharge valve of a metering tank so that the error inherent to the construction of the valve results in only a negligible error in the volume of fluid being measured.

These and other objects of this invention will be understood from the following description taken with reference to the drawing, wherein.

Figure 1:
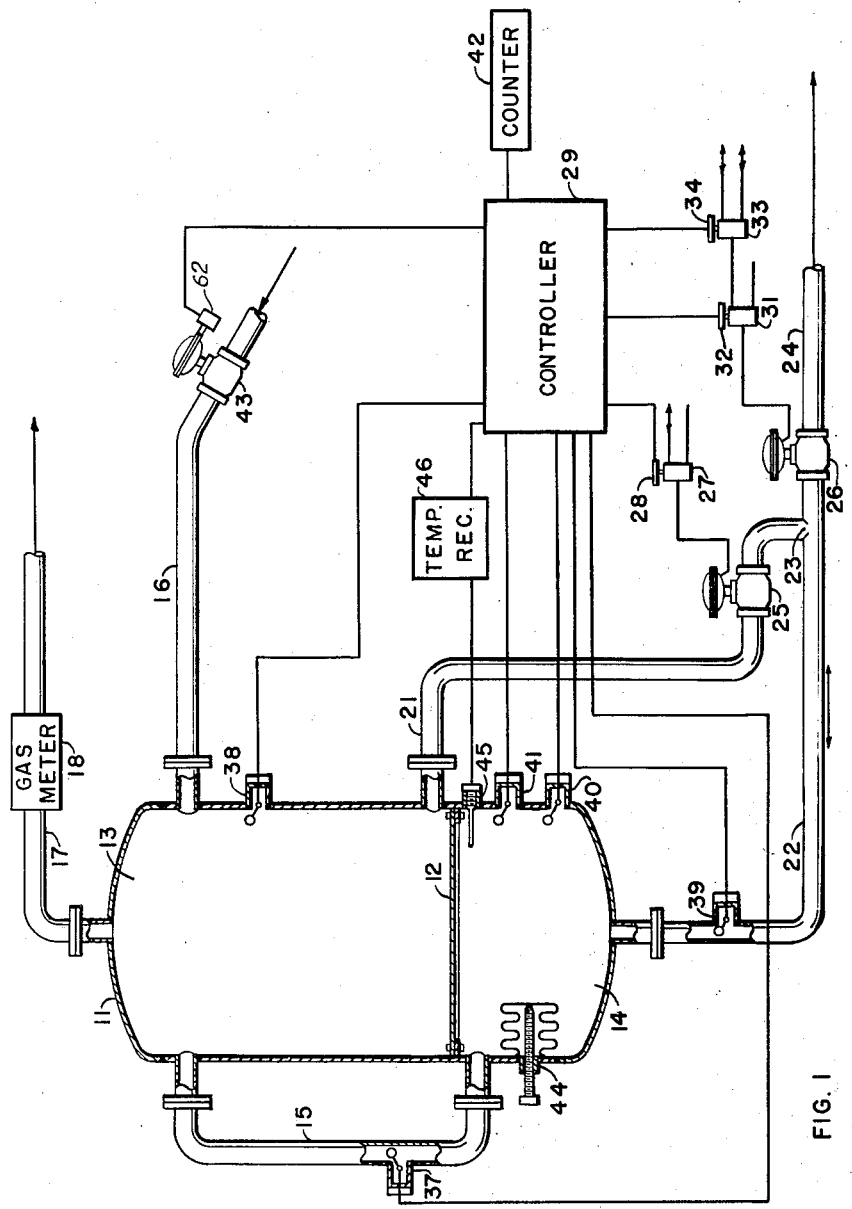
Figure 1 is a partial vertical cross-section view of the metering separator of the present invention giving a schematic representation of the necessary controls.

Referring to Figure 1 of the drawing, the metering separator of the present invention comprises a cylindrical tank 11 having mounted near the bottom thereof a transverse plate 12 which divides the tank 11 into upper and lower fluidtight chambers 13 and 14, respectively. The upper and lower chambers are in communication by means of a conduit 15 which opens to the upper chamber 13 near the top thereof to permit any gas in the lower chamber 14 to escape to the upper chamber 13.

A crude oil inlet line 16 opens to the tank 11 near the top of the upper chamber 13 while a gas discharge line 17 is provided in the tank 11 at the top of the upper chamber 13. A gas meter 18 is provided in the gas discharge line 17 for measuring the amount of gas discharged from the metering separator tank 11.

The tank 11 is provided with a fluid discharge line 21 which is preferably positioned so that it communicates with the lower part of the upper chamber 13 just above the transverse separator plate 12. A second line 22 is in communication with the lower chamber 14 through the bottom of the tank 11. Both of the fluid lines 21 and 22 join at a point 23 and form a common discharge line 24 which leads to a suitable tank battery (not shown).

A power-actuated valve 25 is provided in the fluid line 21. Since the lines 21 and 22 are in communication with each other the valve 25 acts as an inlet valve for fluid passing from the upper chamber 13 through conduits 21 and 22 into the lower chamber 14, and will be known hereinafter as the inlet valve. A second valve 26 is provided in the common discharge line 24 and will be known hereinafter as the discharge valve. Both of the valves 25 and 26 are power actuated. They may be actuated electrically, mechanically, pneumatically, or hydraulically. For purposes of illustration, the valves are shown as air actuated diaphragm valves. The air supply to the inlet valve 25 is controlled by an inlet three-way pilot valve 27 (Skinner Electric Valve Division type M–3 normally-closed solenoid valve) which is electrically-actuated by a solenoid 28 in response to a signal from a central controller 29.

The air-actuated diaphragm outlet valve 26 (Fisher type 657–A throttling valve) is controlled by a three-way outlet pilot valve 31 (Skinner Electric Valve Division type M–3 normally-closed solenoid valve) responsive to a solenoid 32. The air supply to the three-way outlet pilot valve 31 is in turn controlled by a three-way throttling pilot valve 33 (Skinner Electric Valve Division type M–3 normally-closed solenoid valve) and its solenoid 34. This makes it possible either to supply a normal pressure, say 20 pounds per square inch to open valve 26 fully, or to supply a lesser air pressure which may be adjusted so that the outlet valve 26 is throttled to a desired extent to reduce the flow therethrough.

The metering separator is provided with several float switches 37, 38, 39, 40 and 41, which are electrically connected through suitable circuits in the controller 29 to actuate the inlet and discharge valves 25 and 26 as well as a counter 42. The float switch 37 acts as the top float switch for indicating that the lower chamber 14 has been filled with liquid. This top float switch 37 is located in the conduit 15 interconnecting the upper and lower chambers, at a level above the transverse plate 12 separating the two chambers. The normally-closed float switch 38 is located near the upper part of the upper chamber 13 and acts as a cutoff or safety float switch to prevent the liquid in the upper chamber 13 from overflowing and being discharged through the gas discharge line 17. Although the cutoff float switch 38 is not absolutely essential to the operation of this metering separator, it is preferred to have it connected through the controller 29 to operate an inlet valve 43 in the inlet line to the tank 11 with the solenoid 62.

Float switch 39 acts as the bottom switch for the lower chamber 14 to indicate that said chamber 14 is empty. This float switch 39 is preferably located in a vertical section of the fluid discharge line 22 from the lower chamber 14. Another float switch 40 known as a throttle float switch is located in the lower part of the lower chamber 14 and serves to actuate, through controller 29, the throttling three-way pilot valve 33 so as to reduce the air pressure going to the discharge valve 26, thus reducing the rate of flow therethrough. Since the capacity of the lower chamber 14 of the metering separator 11 may have a value such for example as two barrels, another float switch 41 may be provided at the half-way point in this lower chamber to permit the oil to be metered in small units; such for example as one barrel. If desired, the middle float switch 41 may be eliminated.

The lower chamber 14 of the tank 11 is provided with an expansible bellows unit 44 which extends into the chamber 14. By expanding or contracting this bellows unit 44 to a proper setting, the volume of fluid contained in the lower chamber 14 between the top float switch 37 and the bottom float switch 39 may be adjusted to exactly the desired value, such for example as, 2 barrels. A temperature responsive unit 45 (Forboro Code 4442 Temperature Bulb) is preferably mounted on the lower portion of the tank 11 so that it extends into the lower chamber 14. The temperature responsive unit 45 (Forboro Code 4442 Temperature Bulb) measures the temperatures of each charge of oil being metered in the lower chamber 14, which temperature is recorded by energizing the chart drive of a suitable temperature recorder 46 (Foxboro Class IA Temperature Recorder) each time the lower chamber 14 dumps fluid.

Figure 2:
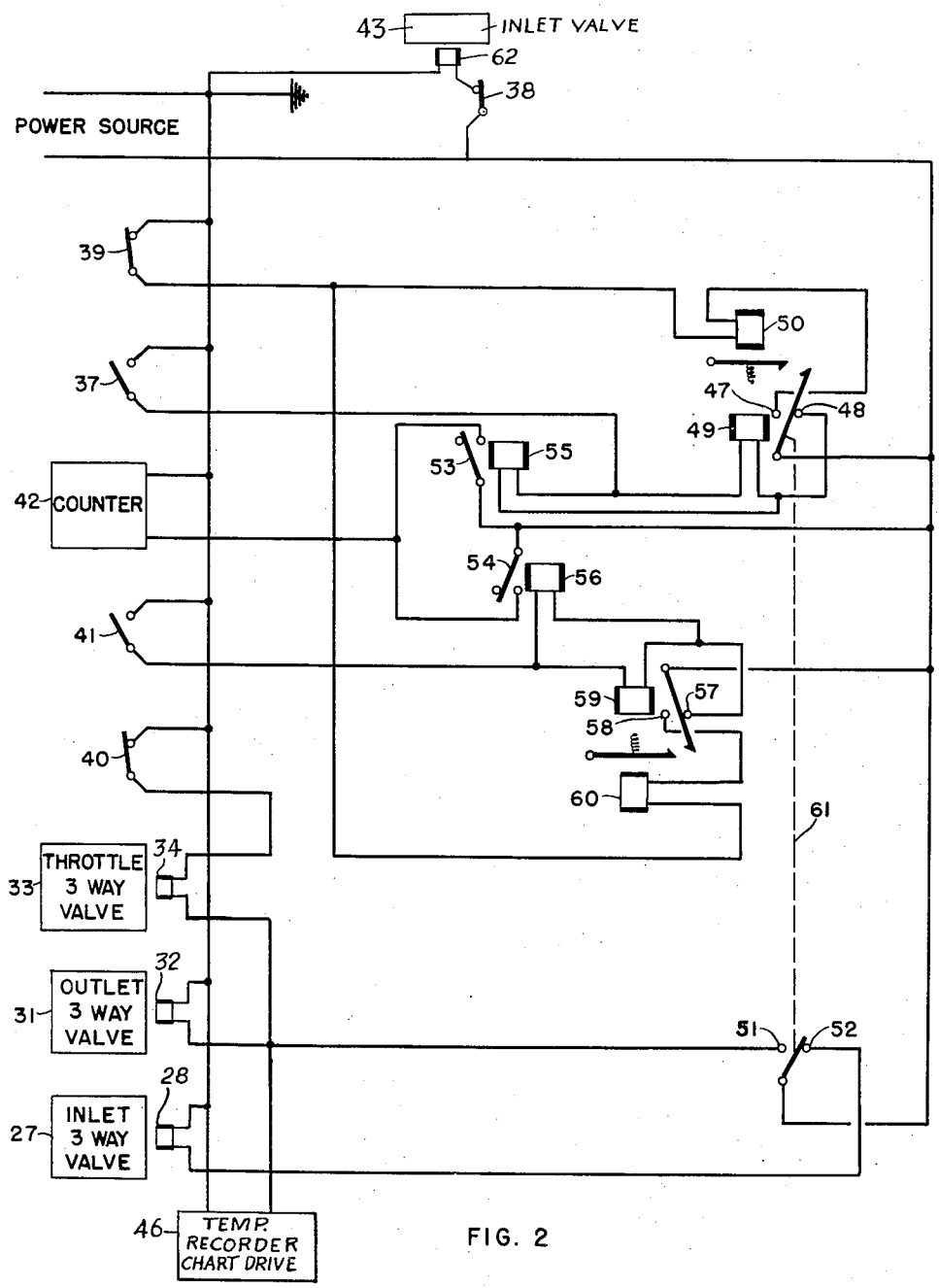
Figure 2 is a circuit diagram of the controls for the metering separator of Figure 1.

The circuits contained within the controller 29 (Figure 1) may be of any suitable design to actuate the inlet valve 25 and the outlet valve 26 in proper sequence in response to the top float switch 37, bottom float switch 39, and throttle float switch 40. One suitable arrangement is shown in Figure 2 of the drawing. The bottom float switch 39 and the throttle float switch 40 are normally closed when the liquid level in the lower chamber 14 is below the level of these switches, while the top float switch 37 and the middle float switch 41 are normally-open switches. The circuit connecting the top float switch 37 and the bottom float switch 39 to the inlet and outlet valves 27 and 31, respectively, is provided with a normally-open contact 47 and a normally-closed contact 48 together with their energizing latching and release coils 49 and 50, respectively. The broken line 61 indicates that the contacts 47 and 48 are mechanically coupled to a normally-open contact 51 and a normally-closed contact 52, both sets of contacts being actuated by coils 49 and 50.

Since the bottom chamber 14 has in the example chosen, a two barrel capacity, and since it may be desired to record the metered volume on the counter in one barrel increments, the counter circuit is provided with two contacts or time delay relays 53 and 54 together with their energizing coils 55 and 56, respectively. Thus, when the normally-open middle float switch 41 and the normally open top float switch 37 are each closed, contacts 53 and 54 will momentarily close to actuate the counter before relays 47—50 and 57—60 break the circuits. Normally-closed contact 57 and normally-open contact 58, together with their energizing latching and release coils 59 and 60, respectively, are provided in the circuit for locking out the counter 42 after the latching coil 59 has momentarily been energized on closure of the middle float switch 41 to momentarily close contact 54 and actuate the counter 42.

In operation of the present metering separator, a production fluid comprising a mixture of oil and gas flows through crude oil inlet line 16 into the upper chamber 13 of the tank 11. The gas separates from the oil in chamber 13 and passes to a gas discharge line 17 to be metered by the gas meter 18. With the lower chamber 14 of the tank 11 empty and has just started to fill, float switch 39 is opened, opening the circuit to coils 50 and 60, as the separated oil flows out through the fluid discharge line 21 and the open inlet valve 25 and line 22 into the lower chamber 14. The control circuit of Figure 2, which is drawn showing the start of the metering cycle, remains as indicated in Figure 2 with the exception that the float switch 39 is now open. As the rising fluid level in the chamber 14 passes the middle float switch 41, the switch is closed and the counter 42 registers one barrel by the momentary closing of contact 54 of relay 56 at the same time contact 58 of relay 57—60 latches closed. As the lower chamber 14 is being filled, any entrained gases that escape from the oil pass off through conduit 15 into the upper chamber 13. The fluid level continues to rise in chamber 14 until it reaches transverse plate 12 at which time the fluid rises up the conduit 15 until it contacts and closes the normally-open top switch 37, registering one additional barrel by momentarily closing contact 53 of relay 55 at the same time contacts 47 and 51 of relay 47—50 latches closed. The metering operation is very accurate since it is controlled by and is dependent on the small volume of liquid rising within the conduit 15 rather than on the large volume rising within the lower chamber 14. For best results the top float switch is located in the riser conduit 15 at a point just above the level of the transverse plate 12.

Upon the closing of the top float switch 37 which latches contacts 47 and 51 of relay 47—50 closed, the controller 29 actuates through contacts 51 and 52 of relay 47—50, the temperature recording drive 46, and the solenoids 28 and 32 together with the connected pilot valves 27 and 31 to close the inlet valve 25 and open the discharge valve 26. With the inlet valve 25 closed, the upper chamber 13 of the tank 11 acts as a surge chamber in which the fluid entering the tank through, crude oil inlet line 16 accumulates.

Upon the opening of the discharge valve 26 the fluid in the lower chamber 14 immediately begins to drain out through discharge lines 22 and 24 to a tank battery. As the fluid level in the chamber 14 drops below the throttle float switch 40, the switch 40 closes as shown in Figure 2 to actuate the three-way throttle pilot valve 33 and its solenoid 34 through the controller 29, thus reducing the air pressure on the diaphragm of the discharge valve, for example, 20 p. s. i., its fully opened pressure, to an adjustable pressure of approximately 4 p. s. i. This throttles the discharge valve sufficiently for the last small amount of fluid in the lower chamber 14 to drain out of the chamber at a rate slow enough to insure the full closing of the discharge valve 26 by energizing coil 50 of relay 47—50 and closing contacts 48 and 52 with the closed switch 39 immediately after the fluid level has passed the bottom float switch 39. Since the rate of flow of fluid from lower chamber 14 through fluid discharge line 22 is considerably reduced by the throttling action of the discharge valve 26 and since the fluid discharge line 22, in which the bottom float switch 39 is positioned, is of small diameter as compared with the diameter of the tank, there is only a negligible error in the measurement of the volume due to the minute amount of fluid that passes discharge valve 26 as it closes.

As seen from the above, the controller 29 is essentially a device for triggering the inlet and discharge valves 25 and 26, respectively, and for counting the number of barrels of fluid produced through the metering separator. The counter 42, incorporated into the controller, is actuated by the controller after each barrel is produced. As the fluid level in the fluid discharge line 22 drops below the bottom float switch 39, the latter is closed, which releases the relay contacts of relays 57—60 and 47—50 which opens the inlet valve 25 and closes the outlet valve 26, thus initiating a new metering cycle.

We claim as our invention:

1. Apparatus for separating and metering a well production fluid consisting of a gas and a liquid, said apparatus comprising a tank, horizontal plate means in said tank dividing said tank into upper and lower chambers, inlet fluid conduit means into said upper chamber, first liquid conduit means having a vertical portion opening through the bottom of the lower chamber of said tank, second liquid conduit means opening from the lower portion of said upper chamber, a valve in each of said conduit means, one of said valves being open while the other is closed, said first and second conduit means being in communication at a point upstream of said valve in said first conduit means and downstream of said valve in said second conduit means, a controller having relay means for alternately opening and closing said valves, vertical conduit means in communication between said lower chamber and the upper portion of said upper chamber, first liquid level responsive switch means in the vertical conduit means, second liquid level responsive switch means in the vertical section of said first conduit means, said liquid level responsive switch means being electrically connected to said relay means for actuating said valves, consecutive actuations of said valves causing the liquid consecutively to fill and to empty the lower chamber of said tank, and counter means actuated by the filling and emptying of said lower chamber for counting the number of times said chamber is filled.

2. Apparatus for separating and metering a two-phase well production fluid consisting of a gas and a liquid, said apparatus comprising a tank, horizontal plate means in said tank dividing said tank into upper and lower chambers, inlet fluid conduit means into said upper chamber near the top thereof, gas discharge conduit means from the top of said tank, first liquid conduit means having a vertical portion opening through the bottom of the lower chamber of said tank, second liquid conduit means opening from the lower portion of said upper chamber, a valve in each of said conduit means, said valves being co-acting valves, one of said valves being open while the other is closed, said first and second conduit means being in communication at a point upstream of said valve in said first conduit means and downstream of said valve in said second conduit means, a controller having relay means for alternately opening and closing said valves, vertical conduit means in communication between said lower chamber and the upper portion of said upper chamber, first liquid level responsive switch means in said vertical conduit means, second liquid level responsive switch means in the vertical section of said first conduit means, said liquid level responsive switch means being electrically connected to said relay means for actuating said co-acting valves, consecutive actuations of said valves causing the liquid consecutively to fill and to empty the lower chamber of said tank, counter means actuated by said controller for counting the number of consecutive actuations of said valves, and third liquid level responsive switch means positioned in said lower chamber of said tank near the bottom thereof and operatively connected through said controller for throttling the valve in said first liquid conduit means to reduce the rate of flow of the last portion of fluid as it leaves the lower chamber.

3. Apparatus for separating and metering a two-phase well production fluid consisting of a gas and a liquid, said apparatus comprising a tank, horizontal plate means in said tank dividing said tank into upper and lower chamber, expansible bellows means extending into said lower chamber for adjusting the volume of said lower chamber, inlet fluid conduit means into said upper chamber near the top thereof, gas discharge conduit means from the top of said tank, gas metering means in said gas discharge conduit means, first liquid conduit means having a vertical portion opening through the bottom of the lower chamber of said tank, second liquid conduit means opening from the lower portion of said upper chamber, a valve in each of said conduit means, said valves being co-acting valves, one of said valves being open while the other is closed, said first and second conduit means being in communication at a point upstream of said valve in said first conduit means and downstream of said valve in said second conduit means, a controller having relay means for alternately opening and closing said valves, vertical conduit means in communication between said lower chamber and the upper portion of said upper chamber, first liquid level responsive switch means in said vertical conduit means, second liquid level responsive switch means in the vertical section of said first conduit means, said liquid level responsive switch means being electrically connected to said relay means for actuating said co-acting valves, consecutive actuations of said valves causing the liquid consecutively to fill and to empty the lower chamber of said tank, means for measuring and indicating the temperature of fluid in the lower chamber of said tank, counter means actuated by said controller for counting the number of consecutive actuations of said valves, and third liquid level responsive switch means positioned in said lower chamber of said tank near the bottom thereof and operatively connected through said controller for throttling the valve in said first liquid conduit means to reduce the rate of flow of the last portion of fluid as it leaves the lower chamber.

References Cited in the file of this patent

UNITED STATES PATENTS

| | | |
|---|---|---|
| 2,158,381 | Raymond | May 16, 1939 |
| 2,211,282 | McKeever | Aug. 13, 1940 |